United States Patent [19]

Yanadori et al.

[11] Patent Number: 4,465,611

[45] Date of Patent: Aug. 14, 1984

[54] HEAT STORAGE MATERIAL

[75] Inventors: Michio Yanadori, Hachioji; Seigo Miyamoto, Takahagi; Keiichi Koike, Matsudo, all of Japan

[73] Assignee: Hitachi, Ltd., Tokyo, Japan

[21] Appl. No.: 447,185

[22] Filed: Dec. 6, 1982

[30] Foreign Application Priority Data

Dec. 9, 1981 [JP] Japan .............................. 56-196788

[51] Int. Cl.$^3$ .............................................. C09K 5/06
[52] U.S. Cl. ...................................... 252/70; 423/497
[58] Field of Search ........................................... 252/70

[56] References Cited

U.S. PATENT DOCUMENTS 4,189,394  2/1980  Schröder et al. ..................... 252/70
4,329,242  5/1982  Lane et al. ............................ 252/70

FOREIGN PATENT DOCUMENTS 7096079  6/1982  Japan .
7801037  8/1979  Sweden .

OTHER PUBLICATIONS

Teoreanu et al., "Cohesive Properties of the MO—MCl$_2$—H$_2$O System", Rev. Roum. Chim., 1971, 16(6), 861-867, (Chemical Abstracts 75(16) 102151r.

Primary Examiner—John E. Kittle
Assistant Examiner—Robert A. Wax
Attorney, Agent, or Firm—Antonelli, Terry & Wands

[57] ABSTRACT

When strontium oxide is applied as a nucleating agent to calcium chloride-hexahydrate as a heat storage material, a supercooling phenomenon of the resulting heat storage material can be suppressed to be slight.

2 Claims, 3 Drawing Figures

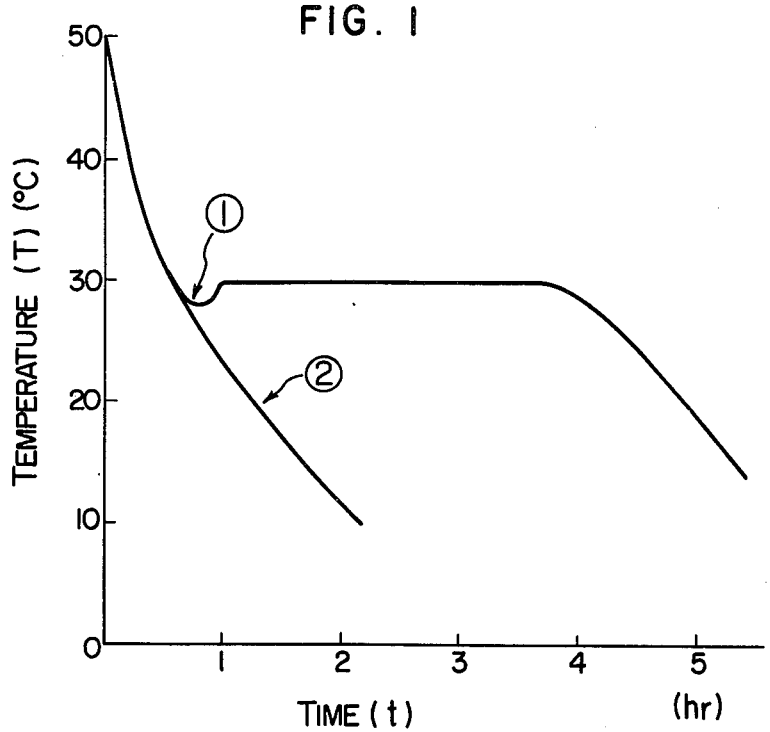
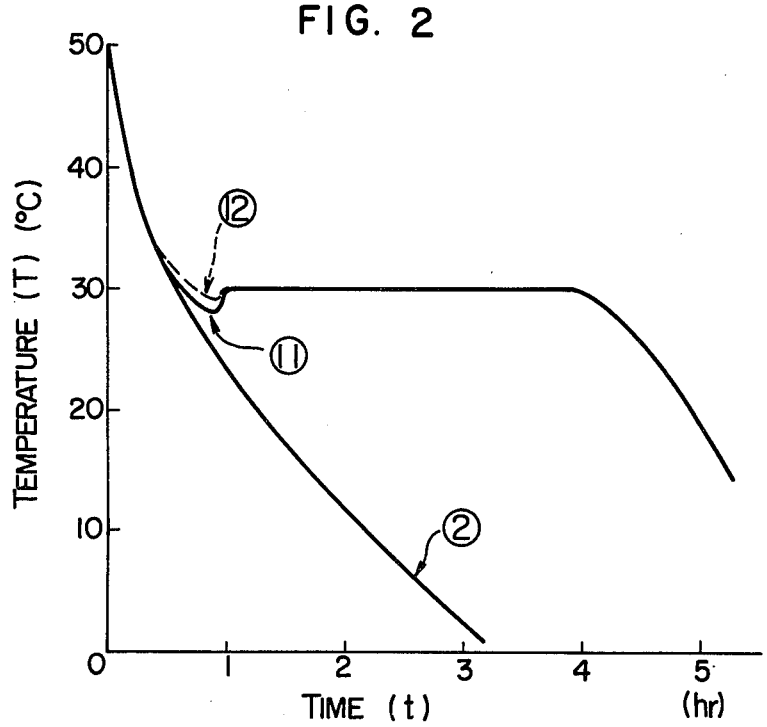

HEAT STORAGE MATERIAL

BACKGROUND OF THE INVENTION

This invention relates to a heat storage material comprising calcium chloride-hexahydrate as the main component.

Since calcium chloride-hexahydrate ($CaCl_2.6H_2O$, m.p. 30° C.) is inexpensive and has large latent heat, it is a hopeful material as a latent-heat storage material for hothouses and heat-pump type air conditioners. However, it seriously undergoes a supercooling phenomenon at the time of heat release and does not release latent heat even if its temperature is lowered to a temperature of 20° C. or more lower than the solidifying point. Therefore, it cannot be used as a heat storage material unless its supercooling phenomenon undesirable for a heat storage material is avoided.

In U.S. Pat. No. 4,189,394 is disclosed a heat storage material containing, as a nucleating agent for avoiding the supercooling phenomenon, one or more compounds selected from the group consisting of barium carbonate, strontium carbonate, barium fluoride, barium fluoride-hydrofluoride and strontium fluoride.

In Japanese Patent Appln Kokoku (Post-Exam Publn) No. 9596/78 is known, as nucleating agents, one or more compounds selected from the group consisting of anhydrous barium hydroxide, barium hydroxide-octahydrate, anhydrous strontium hydroxide and strontium hydroxide-octahydrate.

Further, in Japanese Patent Appln Kokoku (Post-Exam Publn) No. 9959/81 is disclosed a heat storage material in which a strontium halide is used as a nucleating agent.

However, when these already-known nucleating agents are used, the supercooling temperature of the resulting heat storage material becomes 3° C. or more, or the nucleating agents are molten and lost during a heat cycle in the heat storage material, so that they are poor in reproducibility and change the inherent melting point of the heat storage material.

The heat design for a heat storage tank should after be made under the condition that the difference between the melting point of the heat storage material and the temperature of a heat medium is 3° C. or less at the time of taking out heat from the heat storage material, from the viewpoint of the designs of refrigeration cycle and a heat exchanger (since the melting point of calcium chloride is 30° C., the design is made under the condition that the temperature of the heat medium is 27° C.). That is to say, the difference in temperature between a latent-heat storage material is heat storage capsules and a heat medium (e.g., water) flowing outside the heat storage capsules is permissible up to only 3° C. Considering the presence of the thermal resistance of thick portions of the heat storage capsules and the thermal resistance of the heat medium and the capsules, a temperature difference of about 1° C. or more arises in these portions, so that the temperature of calcium chloride cannot be below 28° C. A heat storage material having a degree of supercooling ΔTs of 3° C. or more owing to a combination of a nucleating agent and calcium chloride does not release latent heat due to solidification unless its temperature reaches 27° C. which is 3° C. lower than the melting point of calcium chloride of 30° C. At the aforesaid temperature of 28° C., it is permanently kept in a liquid state as it is in a supercooled state, so that it does not permit, as a latent-heat storage material, the withdrawal of effective latent heat. Therefore, it is very important to find a nucleating agent for limiting the degree of supercooling ΔTs to 2° C. or less. As a nucleation theory, an interfacial-energy theory is now approved. In short, the smaller the interfacial energy between the nucleating agent and the resulting crystal, the easier the formation of crystal nucleus. That is to say, the smaller the contact angle between the nucleating agent and the crystal, the easier the formation of the nucleus.

In order to know whether a nucleating effect is brought about depending upon the interfacial energy or the magnitude of the contact angle, there is now no effective means except an experiment carried out by incorporating, in practice, a nucleating agent into a heat storage material.

SUMMARY OF THE INVENTION

This invention aims at suppressing the supercooling phenomenon of calcium chloride-hexahydrate so as to be within a narrow temperature range, concretely, within 2° C., and thereby improving calcium chloride-hexahydrate into a substance which is easy to use as a heat storage material.

This invention provides a heat storage material comprising calcium chloride-hexahydrate as the storage medium and strontium oxide (SrO) as a nucleating agent for facilitating the nucleation of calcium chloride-hexahydrate.

BRIEF DESCRIPTION OF THE DRAWINGS

FIG. 1 is a graph showing solidification characteristics in one example of the heat storage material of this invention.

FIG. 2 is a graph showing solidification characteristics in another example thereof, and FIG. 3 is a graph showing solidification characteristics in a further example of this invention.

DESCRIPTION OF PREFERRED EMBODIMENTS

Examples of this invention are explained below.

EXAMPLE 1

A mixture prepared by adding 5 g of strontium oxide (SrO) to 100 g of calcium chloride-hexahydrate was placed in a container made of polyethylene. The container was placed in a warm-water bath and heated to about 50° C., after which it was placed in a cold-water bath at 10° C. and allowed to cool, and the temperature of the sample was recorded. The result was as shown by the curve ① in FIG. 1. That is to say, the sample was recovered from supercooling at 28° C. after being supercooled to a temperature 2° C. lower than the solidifying point, 30° C. Thereafter, the temperature of the sample became 30° C. and the sample began to release latent heat. The same procedure as described above was repeated 10 times for the same sample, and as a result, the degree of supercooling could be limited to about 2° C. in all of the 10 runs. The latent heat of the present heat storage material sample was measured by means of a differential calorimeter to be 43 kcal/kg.

In FIG. 1, the curve ② shows a result obtained when no nucleating agent was added.

EXAMPLE 2

A more detailed experiment was carried out for the nucleating agent SrO. A heat cycle test was carried out as follows: five containers made of polyethylene were prepared, and 5 g, 2 g, 1 g, 0.1 g or 0.01 g of strontium oxide was added to 100 g of calcium chloride-hexahydrate in each of the containers to obtain 5 kinds of samples, after which the containers were placed in a warm-water bath and heated to 50° C., and thereafter placed in a cold-water bath at 0° C. and allowed to cool. The temperature was measured by use of a C-C thermocouple on a dotting type recorder having a resolution of 0.1° C. When the heat cycle was repeated 1,000 times, there was no difference due to the difference of the amount of strontium oxide added, and its was confirmed that strontium oxide has a nucleating effect even when its amount is very small, for example, about 0.01% by weight. The degree of supercooling was checked in detail to find that all the samples were so high in performance that, as shown in FIG. 2, they had a degree of supercooling of 2° C. (the curve ⑪) in about 10% of the number of heat cycles and a degree of supercooling of 1° C. or less (the curve ⑫) in 90%, the balance, of the number of heat cycles. The curve ② shows a result obtained when no nucleating agent was added.

EXAMPLE 3

A heat cycle test was carried out as follows: a mixture prepared by adding in combination, 0.01 g of calcium hydroxide ($Ca(OH)_2$), 0.01 g of calcium sulfate ($CaSO_4$) and 0.01 g of strontium oxide (SrO) to 100 g of calcium chloride-hexahydrate was placed in a container made of polyethylene, and the container was placed in a warm-water bath and heated to 50° C., after which it was placed in a cold-water bath at 0° C. and allowed to cool. The temperature was measured by use of a C-C thermocouple on a dotting type recorder having a resolution of 0.1° C. When the heat cycle was repeated 1,000 times, the degree of supercooling was 0° C., and the sample was found to be very high in performance. The result was as shown by the curve ③ in FIG. 3. The curve ② in FIG. 3 shows a result obtained when no nucleating agent was added. The latent heat of the present heat storage material sample was measured by means of a differential calorimeter to be 43 kcal/kg. The same experiment as described above was carried out, except that the calcium sulfate ($CaSO_4$) was replaced by calcium sulfate-dihydrate ($CaSO_4.2H_2O$), to find that the degree of supercooling was also 0° C.

The amount of the nucleating agent added may be very small, and even if it is 0.01% by weight, sufficient effect is brought about. Although there is no particular upper limit of the amount of the nucleating agent added, the added amount thereof is preferably 10% by weight or less because if it is too large, the heat storage capacity decreases.

The melting point of SrO is as very high as 2430° C. The specific gravity of SrO is as large as 4.7, and when SrO is added to $CaCl_2.6H_2O$ (specific gravity: 1.5), it tends to be located in the lower part of the container where the $CaCl_2$ concentration is high. Therefore, SrO is not lost even when added to a heat storage material and used for a long time, and does not melt in the heat storage material to lower the inherent melting point of the heat storage material. Accordingly, SrO is very advantageous as a nucleating agent.

Further, SrO is powdery, and therefore when added to the heat storage material ($CaCl_2.6H_2O$), SrO has an effect of absorbing and agglomerating a trace amount of particles of residuals suspended therein. When the particles of residuals are suspended and surround the surface of nucleating agent, the nucleating agent loses its nucleating effect even when added, and the particles of residuals act as a kind of gel to increase the viscosity, so that they sometimes inhibit heat transmission at the time of heat storage and release. Therefore, it is very important that when added to the heat storage material, powdery SrO aggregates and granulates, and hence absorbs and agglomerates therein particles of residuals to inhibit the undesirable effect of the particles of residuals.

What is claimed is:

1. A heat storage material comprising calcium chloride-hexahydrate and as nucleating agents strontium oxide, calcium hydroxide and calcium sulfate.

2. A heat storage material according to claim 1, wherein the calcium sulfate is calcium sulfate dihydrate $CaSO_4.2H_2O$.

* * * * *